Patented Jan. 3, 1939

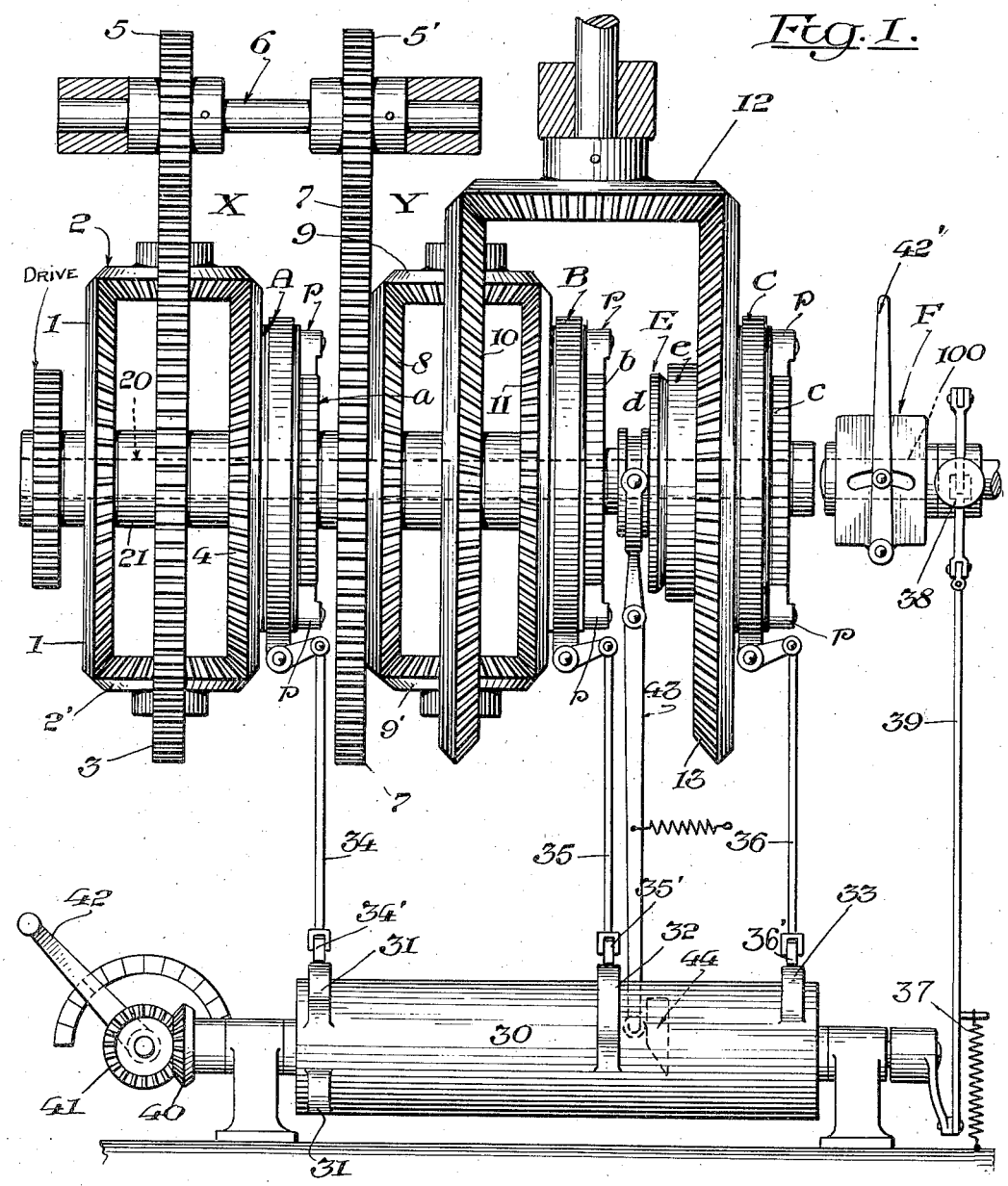
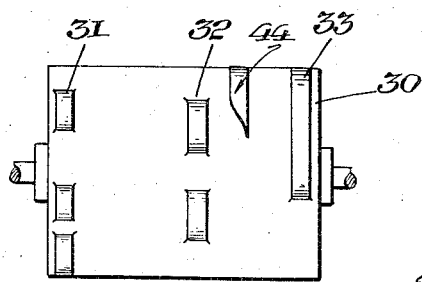

2,142,813

UNITED STATES PATENT OFFICE 2,142,813

MECHANICAL MOVEMENT

Anthony Cory, New York, N. Y.

Application December 21, 1937, Serial No. 180,934

20 Claims. (Cl. 74—260)

This invention relates to an improvement in mechanical movements and more particularly to that type of movement known as differential change speed gearing and has for its object the change of speed by a system of gears between two elements, one of which is a driving element of the internal combustion type and the other a driven element of varied load necessitating such change of gears.

The principal object of this invention is the accomplishment of such change of gears without disconnecting the driving element from the driven element and, therefore, without the necessity of using a clutch for this change and, if used on motor cars or the like, is susceptible of giving any desired number of speed ratios.

A further object of the invention is the provision of means for automatically shifting the gears from one ratio to another in either direction while, at the same time, providing means whereby the automatic feature may be disconnected and a manual shifting of such gears for the purpose of braking the machine substituted when desired.

In the accompanying drawing forming a part of this specification,

Fig. 1 illustrates a plan view of this improved differential change speed gearing together with the operating means therefor, and Fig. 2 illustrates a development of the cam operating mechanism therefor.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

The mechanism comprises driving means such as a gear designated on the drawing by the word "Drive" which may be connected either directly or indirectly to any suitable driving means such as a gasoline motor (not shown). This gear is freely carried on a shaft 20 which, in the present instance, extends the entire length of the gear structure although it would be just as practical to have the various units of this structure mounted on separate shafts if desired.

Secured to this "drive" gear, either directly or by means of a hollow shaft 21 adapted to rotate freely on the shaft 20, is a bevel gear 1. In mesh with this gear is a pair or more of bevel pinions 2 and 2' having their bearings within a gear 3 also loose on the shaft 20.

A bevel gear 4, identical to bevel gear 1 and freely rotatable on the shaft 20, is in mesh with the bevel pinions 2 and 2'. Fixed to this gear 4 is a pulley and brake indicated by the letter A, the operation of which will hereinafter be described, and carried by this pulley A are pawls $p$ adapted to engage a ratchet $a$ carried by the shaft 20 and adapted to rotate therewith. The construction of the pawls $p$ and ratchet $a$ are such that the pawls drive the ratchet but the ratchet may overrun the pawls.

The gears 1, 2, 2', 3 and 4 together comprise a unit otherwise known as a differential coupling and indicated generally by the letter X and before explaining the invention further, it is thought advisable to give the function and operation of these gears as a unit.

If the gear 1 is rotated in a certain direction and the gear 3 held fast against rotation, the gear 4 will rotate in the opposite direction and with the same number of revolutions as the gear 1. If the gear 4 is held fast against rotation and the gear 1 rotated, the gear 3 will travel in the same direction as the gear 1 but at one-half the speed of the gear 1.

In mesh with the gear 3 is a gear 5 fixed to a shaft 6 for rotation therewith. Also fixed to this shaft 6 is a gear 5' adapted to rotate therewith. The gear 5' transmits rotation to a gear 7 which is identical with the gear 3 and likewise adapted to rotate freely on the shaft 20. Any suitable means may be used to transmit rotation from the gear 3 to the gear 7 and this means is merely illustrative of one method of so doing.

Secured to the gear 7 by a gear 8 is a second unit identical to unit X and indicated generally by the letter Y and this unit comprises gears 8, 10 and 11 freely rotatable on the shaft 20 and pinions 9 and 9' which have their bearings within the gear 10. The gear 10 may be the same as the gear 3 or a bevel gear as shown.

Secured to the gear 11 is a pulley, brake and ratchet assembly B, $p$, $b$ similar to A, $p$, $a$ and the function and operation of this unit is similar to that of the unit X. These units X and Y are connected in series and it is apparent from the construction and arrangement that the reduced speed of the gear 3 becomes the driving speed of the gear 8 although this may be changed if desired.

In mesh with the bevel gear 10 is a bevel gear 12 which, in turn, is in mesh with the bevel gear 13 loose on the shaft 20 and of construction similar to the gear 10. Secured to this gear 13 is a pulley, brake and ratchet assembly C, p, c likewise similar to A, p, a and will be described hereinafter.

When the "drive" together with the gear 1 are set in motion while the gear 3 and gear 10 are held against rotation, the gear 4 and, consequently, the pulley A will run at the same speed as the gear 1 but in the opposite direction and the shaft 20 will be carried at that speed. This results in a ratio of 1 to 1 between the "drive" gear and shaft 20. If the gear 3 is allowed to rotate and the gear 10 of the unit Y is held against rotation, the gear 3 will tend to gain speed at the expense of the gear 4 which loses twice the gain of gear 3 and the gain of the gear 3 will be communicated to the gears 7 and 8 and the gear 11 together with B will thus rotate at the same speed as the gear 8 but in the opposite direction.

The gain in speed of the gears 3, 7, 8 and 11 will continue until the pulley B rotates at the same speed as the ratchet b or until A and B synchronize. This results in a ratio of 3 to 1 between the driving means and the shaft 20. However, if the gear 10 is allowed to rotate, the gear 11 will lose twice the speed gained by the gear 10 and this loss will affect the speed of the gear 4 due to the synchronization of A and B. The gear 3 will gain speed and the gear 8 will gain speed, thus affecting the loss by the gear 11 until the pulley C rotates at the same speed as the ratchets a, b and c or until A, B and C synchronize. This produces a ratio of 7 to 1. In other words, in the unit X, the difference between the speed of gears 1 and 4 is wholly made up by the variation of the gear 4 while, in the unit Y, the difference between the gears 8 and 11 is made up of the variation of the gear 11 plus the variation of the gear 8. This, obviously, is due to the fact that, in unit X, the speed of the gear 1 is constant whereas, in unit Y, the speed of the gear 8 is variable.

It will be obvious that this type of reducing gear would be operable in one direction and, therefore, if a reverse operation is desired, as in the case of an automobile, a reverse clutch or gear box F of ordinary construction having a suitable lever 42' would be employed and this would be located between the gear mechanism and the mechanism to be driven thereby, such as the drive shaft 100 of an automobile, and not between the engine and the gear as would be done if the drive shaft or driven element were to be operated in one direction only.

The different synchronizations or changes of speed of the shaft 20 are obtained by the operation of the brakes A, B and C and while, in the description, I have pointed out the ratios obtainable when all brakes are released; when the brake C is applied; and when brakes B and C are applied, it might be desirable to point out that when the brake A, alone, is applied, a gear reduction of 6 to 1 results; when brakes A and B are applied the ratio is 4 to 1; and when brakes A and C are applied, the ratio is 2 to 1.

In order to operate this brake mechanism, I provide a rotary cam drum 30 having a series of cams 31, 32 and 33 in position to engage the links 34, 35 and 36 connected with the brakes A, B and C, respectively. These brake rods or links carry suitable rollers 34', 35' and 36' in position to engage their respective cams for releasing the brakes which are engaged by means of suitable springs (not shown).

This cam drum 30 is maintained in position normally to maintain the brakes in released position by suitable spring 37. The drive shaft 100 may be equipped with a governor 38 of standard construction and this governor is connected by means of suitable links 39 to the cam drum 30 and in position to rotate the drum.

Carried by the cam drum by any suitable means is a gear 40 in position to engage a gear 41 connected with a lever 42 for rotating the cam drum by hand.

The operation of the present invention is as follows:

When the reversible clutch F is in neutral position, all the gears are rotating, thereby synchronously rotating the shaft 20 at low speed or at the greatest reduction. For forward or reverse, as may be desired by the operator, the clutch F is shifted in either direction by means of the lever 42' to engage the shafts 20 and 100. When the speed of the shaft 100 is brought up to the speed of the shaft 20, the lever 42 is shifted to rotate the cam drum 30 until the brake A is applied, stopping the gear 4. At this point, the remaining gears rotate at slightly increased speed due to the increased speed of the gear 3 and, consequently, the shaft 20 is driven faster.

Obviously, with the increase in speed of the shaft 20, the shaft 100, being engaged therewith, will increase in speed with the shaft 20 and the lever 42 is then again shifted, causing the drum 30 further to rotate. This action will apply the brake B with the result that the remaining gears again gain in speed until the shafts 20 and 100 also rotate faster.

The continued operation of the lever 42 upon the cam drum is as follows: the brakes A and B are released and the brake C engaged; the brake B is released and brakes A and C engaged; and, finally, the brake A is released and the brakes B and C engaged, at which point the shaft 20 is rotated by the gear 4 at the ratio of 1 to 1 or a direct drive equivalent to high speed.

The aforementioned action, of course, may be accomplished by the use of the governor, if desired, in which case, the cam drum 30 is controlled by the speed of the governor on the shaft 100.

As is apparent, since the construction of this device is such that the shaft 20 can overrun the drive means, it is not possible by a change of ratios to use the engine for braking when it is applied to structures that may gain self-acceleration as, for instance, an automobile going down hill. Therefore, provision must be made to overcome this and also to permit the ratio between the driving and driven means to be reduced positively and, for this purpose, I provide a clutch E having its part d located on the shaft 20 and adapted to rotate therewith and its part e secured to the gear 13. This clutch is connected by means of a lever 43 to a cam shifter 44 carried by the cam drum 30. This cam shifter 44 may be positioned suitably to permit the gear reduction desired which, of course, would necessitate a change in position of the clutch E accordingly. However, in the present instance, I have illustrated it in position to be used with the application of brakes A and B applied and brake C released.

When the drum is shifted to this position, the clutch E is engaged and the shaft 20 must, therefore, drive the motor through the clutch and as this is a reduction of 4 to 1, it will permit the motor to act as a brake.

It is to be understood that additional units similar to X and Y may be provided should further reductions be desired.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. Power transmission mechanism comprising a driven shaft, driving means therefor comprising a plurality of connected differential gear coupling units and a gear unit between said coupling units and the shaft, brake mechanism carried by a member of each of said units, means for selectively operating said brake mechanisms, ratchets carried by the driven shaft, and pawls carried by a member of each unit for rotation therewith whereby, on the release of any of said brake mechanisms, the rotating pawls will drive the driven shaft.

2. Power transmission mechanism comprising a driven shaft, driving means therefor comprising a plurality of connected differential gear coupling units and a gear unit between said coupling units and the shaft, ratchet mechanism connecting each of the units with the shaft, brake mechanism for each of said ratchet mechanisms, means for selectively operating said brake mechanisms, and means for automatically operating said brake mechanisms whereby, on the release of any of said brakes the gear unit so released will drive the driven shaft through its ratchet mechanism.

3. Power transmission mechanism comprising a driven shaft, driving means therefor comprising a plurality of connected differential gear coupling units and a gear unit between said coupling units and the shaft, ratchet mechanism connecting each of the units with the shaft, brake mechanism for each of said ratchet mechanisms, means for selectively operating said brake mechanisms, and means for connecting said driven shaft and driving means independently of said ratchet mechanism whereby, on the release of any of said brakes the gear unit so released will drive the driven shaft through its ratchet mechanism.

4. Power transmission mechanism comprising a driven shaft, driving means therefor comprising a plurality of connected differential gear coupling units and a gear unit between said coupling units and the shaft, means connecting a member of each of the units with the shaft, brake mechanism for each of said connecting means, and means for selectively operating said brake mechanisms said connecting means comprising pawls adapted to rotate with one member of each unit and a ratchet secured to the shaft whereby on the release of any of said brake mechanisms the rotation of the pawls will cause rotation of the ratchets thereby to drive the driven shaft.

5. Power transmission mechanism comprising a driven shaft, driving means therefor comprising a plurality of connected differential gear coupling units and a gear unit between said coupling units and the shaft, means connecting a member of each of the units with the shaft, brake mechanism for each of said connecting means, means for selectively operating said brake mechanism, and means for connecting said driven shaft and driving means independently of said first connecting means.

6. Power transmission mechanism comprising driving and driven means, a gear train comprising a plurality of differential coupling units connected in series and a gear unit between said coupling units and the driven means, means connecting a gear of each unit with the driven means for synchronously driving said driven means, and means for selectively stopping any of said connecting means and its gear whereby the speed of the remaining gears will be increased and the driven means driven at a greater speed.

7. Power transmission mechanism comprising driving and driven means, a gear train comprising a plurality of differential coupling units, each having a driving gear and a pair of driven gears, means comprising ratchet mechanism connecting one of the driven gears of each coupling and the second driven gear of the last coupling to the driven means for synchronously driving said driven means, and means for selectively stopping any of said driven gears whereby on the stoppage thereof the remaining gears will drive the driven means at increased speed.

8. Power transmission mechanism comprising driving and driven means, a plurality of differential coupling units, each having a driving and a pair of driven gears, means connecting one of said driven gears to the driving gear of the next coupling, and means for connecting the second of said driven gears and both of said driven gears of the last coupling to the driven means for synchronously driving the driven means, and means for selectively stopping any of said driven gears whereby the remaining gears will drive the driven means at increased speed.

9. Power transmission mechanism comprising driving and driven means, a gear train comprising a pair of differential coupling units, means connecting one of the driven gears of one of said couplings and both driven gears of the other of said couplings with the driven means for synchronously driving the driven means, and means for selectively stopping any of said driven gears whereby on the stoppage of any of said gears the remaining gears will drive the driven means at increased speed.

10. Power transmission mechanism comprising driving and driven means, a plurality of ratchets carried by said driven means, said driving means comprising a plurality of differential coupling units connected in series whereby one of the driven gears of each coupling drives the driving gear of the next succeeding coupling, means connecting the other driven gear of each coupling and both driven gears of the last coupling with the ratchets carried by the driven means for synchronously driving said driven means, and means for selectively stopping any of said driven gears whereby the remaining gears will drive the driven means at increased speed.

11. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, and means for selectively stopping any of said driven gears whereby the remaining gears will drive the driven means at increased speed, said last means comprising a plurality of brakes.

12. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, means for selectively stopping any of said driven gears whereby the remaining gears will drive the driven means at increased speed, said last means comprising a plurality of brakes, and means for automatically engaging said brakes.

13. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, means for selectively stopping any of said driven gears whereby the remaining gears will drive the driven means at increased speed, said last means comprising a plurality of brakes, and means for automatically engaging said brakes, said means comprising a governor.

14. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, means for selectively stopping any of said driven gears whereby the remaining gears will drive the driven means at increased speed, said last means comprising a plurality of brakes, and means for engaging and disengaging any of said brakes.

15. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, means for selectively stopping any of said driven gears whereby the remaining gears will drive the driven means at increased speed, said last means comprising a plurality of brakes, means for engaging and disengaging any of said brakes, and means for positively connecting the driving and driven means independently of said previous connecting means.

16. Power transmission mechanism comprising driving and driven means, a plurality of differential coupling units, each having a driving and a pair of driven gears, means connecting one of said driven gears to the driving gear of the next coupling, means for connecting the second of said driven gears and both of said driven gears of the last coupling to the driven means for synchronously driving the driven means, means for selectively stopping any of said driven gears whereby the remaining gears will drive the driven means at increased speed, said last means comprising a plurality of brakes, means for engaging and disengaging any of said brakes, and means for positively connecting the driving and driven means independently of said previous connecting means, said last means comprising means for engaging certain of said brakes, and a clutch connecting one of the driven gears with the driven means whereby said driven means will be driven through the clutch at a reduced speed.

17. Power transmission mechanism comprising driving and driven means, a plurality of differential coupling units connected in series, a plurality of ratchet mechanisms connecting the driven gears of said units with the driven means for synchronously driving the driven means, brake mechanism for each ratchet mechanism, and means for selectively engaging and disengaging any of said braking mechanisms whereby the speed ratio between the driving and driven means will be changed.

18. Power transmission mechanism comprising driving and driven means, a plurality of differential coupling units connected in series, a plurality of ratchet mechanisms connecting the driven gears of said units with the driven means for synchronously driving the driven means, brake mechanism for each ratchet mechanism, and means for selectively engaging and disengaging any of said braking mechanisms whereby the speed ratio between the driving and driven means will be changed, said means comprising a cam drum having a plurality of cams thereon in position to selectively engage said brake mechanisms.

19. Power transmission mechanism comprising driving and driven means, a plurality of differential coupling units connected in series, a plurality of ratchet mechanisms connecting the driven gears of said units with the driven means for synchronously driving the driven means, brake mechanism for each ratchet mechanism, means for selectively engaging and disengaging any of said braking mechanisms whereby the speed ratio between the driving and driven means will be changed, said means comprising a cam drum having a plurality of cams thereon in position to selectively engage said brake mechanisms, and means for automatically rotating said cam drum whereby on the rotation in one direction, the braking mechanisms will be engaged and in the opposite direction the braking mechanisms will be released.

20. Power transmission mechanism comprising driving and driven means, a plurality of differential coupling units connected in series, a plurality of ratchet mechanisms connecting the driven gears of said units with the driven means for synchronously driving the driven means, brake mechanism for each ratchet mechanism, means for selectively engaging and disengaging any of said braking mechanisms whereby the speed ratio between the driving and driven means will be changed, said means comprising a cam drum having a plurality of cams thereon in position selectively to engage said brake mechanisms, and means for positively engaging the driving and driven means independently of said ratchet mechanism.

ANTHONY CORY.